Patented Aug. 21, 1923.

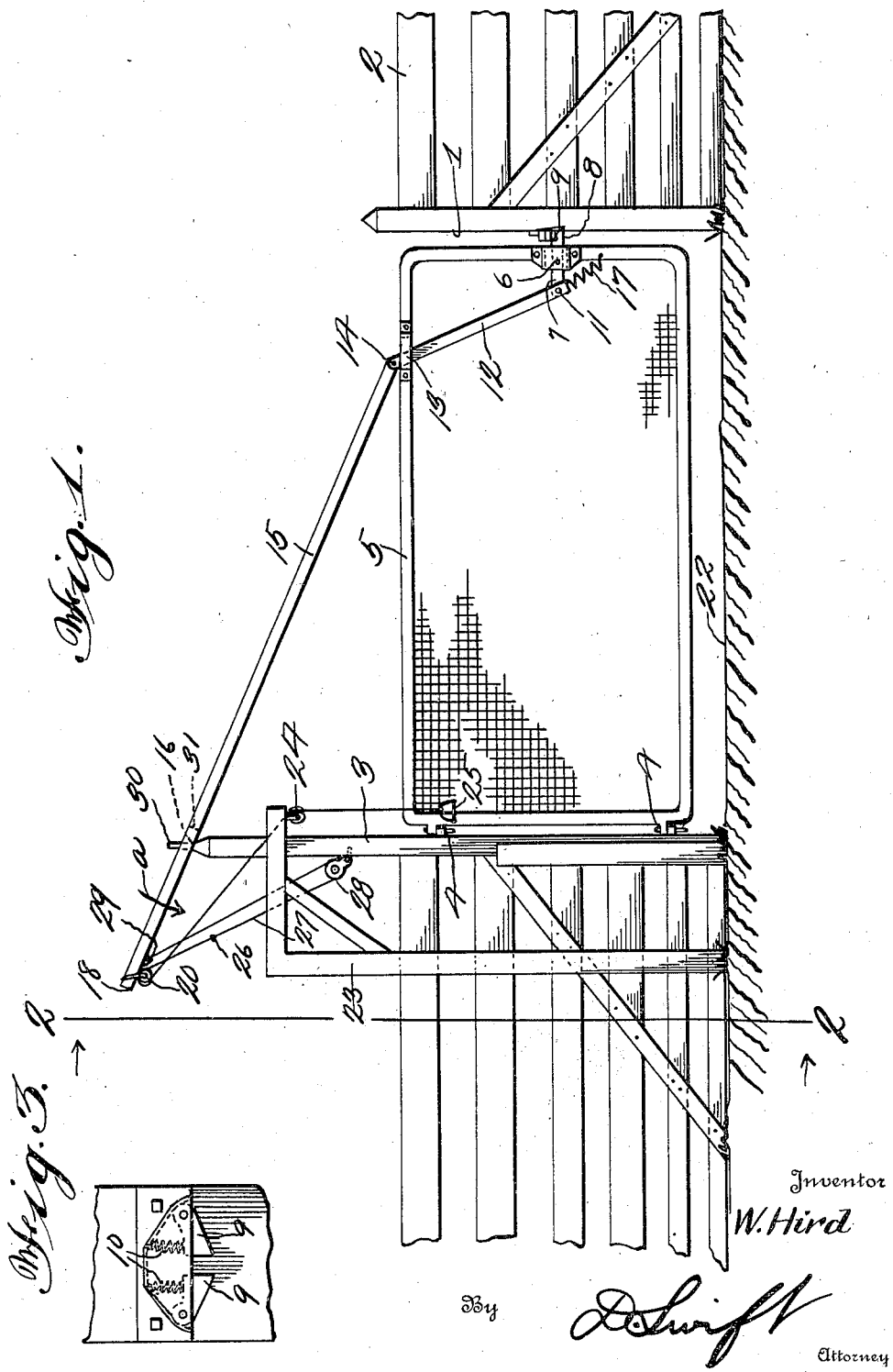

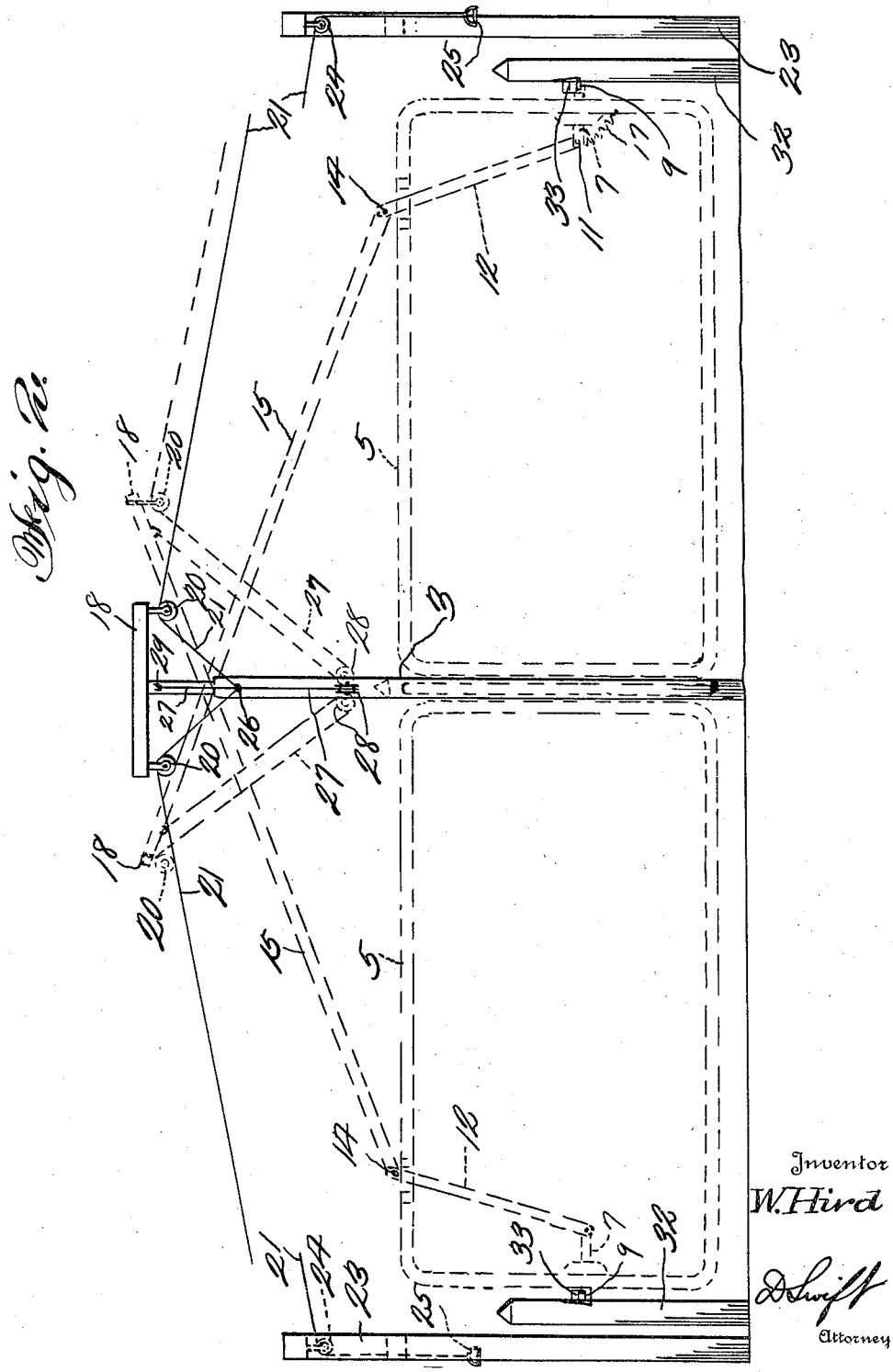

1,465,551

UNITED STATES PATENT OFFICE.

WILLIAM HIRD, OF CUBA, WISCONSIN.

GATE OPENER.

Application filed June 5, 1922. Serial No. 565,883.

*To all whom it may concern:*

Be it known that I, WILLIAM HIRD, a citizen of the United States, residing at Cuba, in the county of Grant, State of Wisconsin, have invented a new and useful Gate Opener; and I do hereby declare the following to be a full, clear, and exact description of the invention, such as will enable others skilled in the art to which it appertains to make and use the same.

The invention relates to gates and has for its object to provide a gate vertically pivoted and movable in a horizontal plane, which gate may be opened from either side of the gate by imparting a pull on cable members, which will not only move the gate but will also unlatch the gate.

A further object is to provide posts adjacent the roadway having latching devices for cooperating with the latch member carried by the free end of the gate for holding the gate in open position. The latch member being controlled by the cables, thereby allowing the gate to be closed by a pull on the cables.

With the above and other objects in view the invention resides in the combination and arrangement of parts as hereinafter set forth, shown in the drawing described and claimed, it being understood that changes in the precise embodiment of the invention may be made within the scope of what is claimed without departing from the spirit of the invention.

In the drawing:—

Figure 1 is a side elevation of the gate showing the road bed in transverse cross section.

Figure 2 is a sectional view taken on line 2—2 of Figure 1.

Figure 3 is a front elevation of one of the latching devices.

Referring to the drawing, the numeral 1 designates a gate opening in a fence 2 and 3 a post at one side of said opening. Hingedly connected at 4 to the post 3 is a horizontally movable gate 5, which may open to either side of the gate opening thereby allowing the gate to be operated in a direction away from the direction of the approach to the gate of the operator. Pivotally connected at 6 to the free end of the gate 5 is a lever 7, the end 8 of which cooperates with spring actuated pivoted dogs 9 when the gate is closed in such a manner that the end 8 of the lever 7 will force one of the dogs upwardly against the action of a spring 10, but will come into engagement with the end of the adjacent dog 9 and be limited in its movement and the actuated dog 9 will be forced downwardly by the spring 10 until the lever is held between the dogs 9. Pivotally connected at 11 to the inner end of the lever 7 is an upwardly and rearwardly extending bar 12, which bar extends through a guide bracket 13 and has pivoted thereto at 14 an upwardly and rearwardly extending operating lever 15. The lever 15 is pivotally and rockably mounted at 16 on the upper end of the post 3, and when rocked downwardly in the direction of the arrow *a* at its rear end pulls upwardly on the bar 12 against the action of a spring 17, thereby moving the lever of the lever 7 downwardly to a point where it will be below the dogs 9 and where the lever will not interfere with the opening of the gate. The rear end of the operating lever 15 is provided with a cross bar 18, to the outer ends of which pulleys 20 are secured. The pulleys 20 have passing thereover cables 21 which cables extend along the side of the road bed 22 to posts 23, which may be located at any distance desired from the gate 5. Cables 21 pass over pulleys 24 carried by the posts 23 and terminate in handle members 25 adapted to be grasped by the operator when it is desired to open the gate. The inner ends of the cables 21 extend downwardly and inwardly and are connected at 26 to the downwardly and upwardly extending cable 27, which passes over the pulley 28 carried by the post 3 and has its end anchored at 29 to the lever 15, therefore it will be seen that when the operator grasps one of the handle members 25 and pulls downwardly on the same that the initial pull on the cable will rock the operating lever 15 on its pivotal point 16 and rock the end 8 of the lever 7 downwardly and release the gate. The unfastening of the gate takes place on the initial pull of either of the cables 21, therefore it will be seen that a further pull on the cables 21 will cause a pivotal movement of the operating lever 15 and said operating lever will cause the gate to open. The pivotal point 16 is formed by the pin 30, which extends through an elongated aperture 31 in the lever 15, said elongated aperture forming means for allowing sufficient movement of the lever as the gate swings open whereby the lever will not interfere with the opening of the gate incident to the hinging points 4 and the pivotal points 16 not being in vertical alignment.

Located adjacent the side of the road bed 2 are posts 33, the inner faces of which are provided with keeper members 33 similar to that shown in Figure 3, therefore it will be seen that the gate may be locked in open position and held against swinging to closed position when a vehicle is passing through the gate opening. After the vehicle has passed through the gate opening the operator reaches out and grasps the handle member 21 adjacent the vehicle, imparts a pull on the handle member and cable 21, the initial pull of which will release the gate from the keeper member 33 and a further pull removes the gate to closed position.

From the above it will be seen that a gate operating mechanism is provided which is simple in construction and so constructed that the operator may operate the gate and its fastening mechanism by imparting a pull on the cable, the operator being located on either side of the gate. It will also be seen that means is provided for automatically latching the gate in open position, which means is moved to inoperative position by a pull on the cables.

The invention having been set forth what is claimed as new and useful is:—

The combination with a vertically pivoted gate, of a latching and gate opening mechanism therefor, said mechanism comprising a pivoted latching lever carried by the forward end of the gate, an upwardly extending bar pivoted to said latching lever, a post to which the gate is pivotally connected, a pivoted and vertically rockable lever carried by said post and having its rear end provided with a cross bar, pulleys carried by the ends of said cross bar, a cable connected to the rear end of the pivoted and rockable lever, said cable extending downwardly and upwardly over a pulley carried by the post, the upper end of said cable being connected to upwardly extending cables, said last named cables extending over the pulleys carried by the ends of the cross bar and forming means whereby the rockable and pivoted lever may be rocked and then moved pivotally.

In testimony whereof I have signed my name to this specification in the presence of three subscribing witnesses.

WILLIAM HIRD.

Witnesses:
W. S. WIMMER,
BERTHA HEITKAMP,
H. D. MELOY.